(12) United States Patent
Nunez-Tejerina et al.

(10) Patent No.: US 9,300,494 B2
(45) Date of Patent: Mar. 29, 2016

(54) MATCHING CLIENT DEVICE TO APPROPRIATE DATA PACKAGE

(75) Inventors: Fabian Nunez-Tejerina, Redmond, WA (US); Kurt A. Geisel, Redmond, WA (US); Noel Anderson, Bellevue, WA (US); Samer Fouad Sawaya, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 389 days.

(21) Appl. No.: 13/190,662

(22) Filed: Jul. 26, 2011

(65) Prior Publication Data

US 2013/0031274 A1 Jan. 31, 2013

(51) Int. Cl.
| | |
|---|---|
| *G06F 15/16* | (2006.01) |
| *H04H 20/74* | (2008.01) |
| *H04L 12/64* | (2006.01) |
| *H04L 12/771* | (2013.01) |
| *G06F 9/445* | (2006.01) |
| *H04W 8/18* | (2009.01) |
| *H04W 4/18* | (2009.01) |
| *H04L 29/08* | (2006.01) |

(52) U.S. Cl.
CPC .............. *H04L 12/6418* (2013.01); *G06F 8/60* (2013.01); *H04L 45/563* (2013.01); *H04W 8/18* (2013.01); *H04L 67/306* (2013.01); *H04W 4/18* (2013.01)

(58) Field of Classification Search
CPC .................. H04L 29/08081–29/08117; H04L 45/56–45/563; G06F 8/60–8/61; H04W 4/18; H04W 8/18–8/24
USPC ........................................................ 709/250
See application file for complete search history.

(56) References Cited

U.S. PATENT DOCUMENTS

| | | | |
|---|---|---|---|
| 5,745,568 A * | 4/1998 | O'Connor et al. ............... 705/56 |
| 6,148,340 A * | 11/2000 | Bittinger et al. ............... 709/224 |
| 6,311,058 B1 * | 10/2001 | Wecker et al. ................. 455/418 |
| 8,447,834 B1 * | 5/2013 | Koya et al. ..................... 709/218 |
| 2004/0098361 A1 * | 5/2004 | Peng .................................. 707/1 |
| 2006/0095957 A1 | 5/2006 | Lundblade et al. |
| 2006/0230030 A1 * | 10/2006 | Volpa et al. ........................ 707/3 |
| 2007/0203880 A1 | 8/2007 | Kumar et al. |
| 2007/0294385 A1 * | 12/2007 | Kapadekar et al. ........... 709/223 |
| 2009/0149220 A1 | 6/2009 | Camilleri et al. |
| 2010/0081423 A1 | 4/2010 | Knight |
| 2010/0088696 A1 | 4/2010 | Stoev et al. |
| 2011/0191380 A1 * | 8/2011 | Karnam et al. ................ 707/792 |
| 2012/0022981 A1 * | 1/2012 | Morgenstern et al. .......... 705/30 |
| 2012/0227084 A1 * | 9/2012 | Shen ................................. 726/2 |
| 2012/0317261 A1 * | 12/2012 | Ahmavaara ................... 709/223 |

OTHER PUBLICATIONS ("How Setup Selects Drivers", http://www.osronline.com/ddkx/install/install-over_7dnr.htm; Apr. 11, 2003).*

(Continued)

*Primary Examiner* — Brendan Higa
(74) *Attorney, Agent, or Firm* — John Jardine; Judy Yee; Micky Minhas

(57) ABSTRACT

One or more techniques and/or systems are disclosed for matching a client device with an appropriate network service provider data package. A device ID for the client device can be decomposed to one or more device ID ranges in a device decomposition set. One or more ranges of client ID can be assigned to a network service provider data package, which can be decomposed into a set of package decomposition ranges in a package decompositions set. The device decomposition set can be compared to the package decomposition set, and if an intersection is identified between the sets, the network service provider data package can be provided to the client device.

20 Claims, 8 Drawing Sheets

(56) References Cited

OTHER PUBLICATIONS

De Berg et al, Computational Geometry, Algorithms and Applications, 3rd edition, Springer, 2008).*

Microwave selling, http://acm.bupt.edu.cn/onlinejudge/newoj/showProblem/show_problem.php?problem_id=1308, 2010).*

"Windows Phone 7 Privacy Statement", Retrieved at <<http://www.microsoft.com/windowsphone/en-us/privacy.aspx>>, Retrieved Date: Apr. 6, 2011, p. 1.

* cited by examiner

MATCHING CLIENT DEVICE TO APPROPRIATE DATA PACKAGE

BACKGROUND

In a computing environment, a device can utilize software, services and hardware from a variety of providers. For example, a device may comprise hardware components from a first provider, software components from a second provider and services from a third provider. Further, the device may connect to a network service provider that provides data and/or voice services over a network. One or more of the device providers may wish to allow for a customized user experience, for example, where the device utilizes applications, data, and/or metadata that is specific to the device, software and/or services. For example, a network service provider may load a data package onto the device that provides a customized, branded user experience to the user. As an illustrative example, device/hardware appropriate software (e.g., application plus other data, such as localized names and icons) can be provided by the network service provider that provides device specific data services to a given mobile broadband device.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A network service provider (NSP), such as a mobile network operator (MNO) and/or mobile virtual network operator (MVNO), can provide customized data packages (e.g., comprising metadata and applications), for example, that may allow a custom, branded experience for their subscribers. In order to deliver an appropriate customized data package (e.g., matched to the client device), a device ID for a client device (e.g., and/or hardware on a client device, such as a SIM card) can be read and matched with a customized package from a cloud/network. However, as an example, a second NSP may lease a subset of subscriber identity (e.g., International Mobile Subscriber Identity (IMSI)) ranges (e.g., or other identifiers) from a first NSP. In this example, the device ID for the client device may not be able to be matched against the second NSP subscriber range, as the subset is comprises in the set of ranges assigned to the first NSP.

Accordingly, one or more techniques and/or systems are disclosed for matching of a particular, specific, customized, etc. operator experience to specific ranges of client IDs, for example, thereby allowing an NSP to provide customized experiences to their customers. The NSP can assign one or more ranges of client IDs to the data package and a device ID can be matched against the assigned ranges. The client ID ranges, for example, can be decomposed into a plurality of package decomposition ranges, and the device ID can be decomposed into one or more device ID ranges. The respective sets of decomposed ranges (e.g., the package decompositions set and the device decomposition set) can be compared to determine if they intersect (e.g., comprise a matching member element). If they intersect, the associated data package can be provided to the client device.

In one embodiment of matching a client device with an appropriate network service provider data package, a device identification (ID) can be received for the client device. Further, a package decomposition set can be received for the network service provider data package, where the package decomposition set comprises one or more ranges of client IDs that are associated with the network service provider data package. Additionally, the device ID can be compared to the package decomposition set, and if at least a portion of the device ID (e.g., and/or ID for hardware on a client device, such as a SIM card) is comprised in the package decomposition set the network service provider data package can be provided to the client device.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
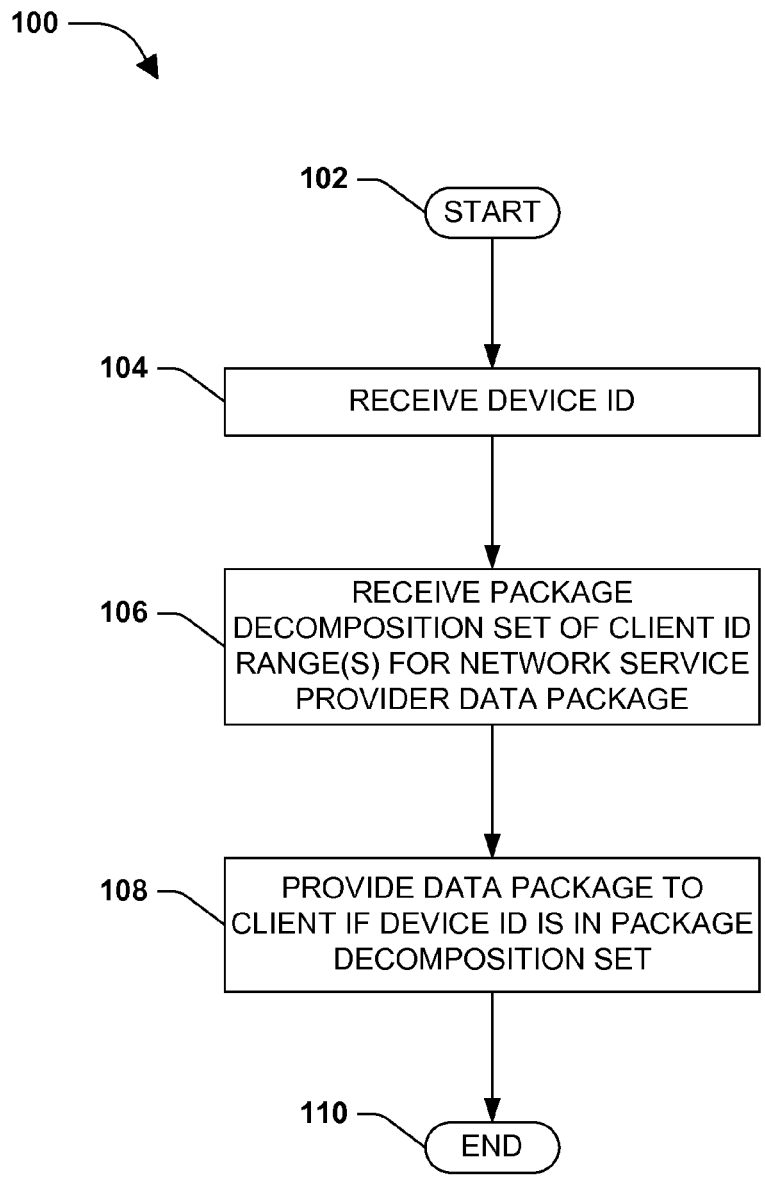
FIG. 1 is a flow diagram illustrating an exemplary method for matching a client device with an appropriate network service provider data package.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

As provided herein, a method may be devised that provides for matching a client device to an appropriate data package from a network service provider. For example, when the network service provider (NSP) wishes to provide a customized experience for a subscriber of their service the NSP can provide a data package (e.g., comprising applications and/or metadata) that can be downloaded to the client device. In one embodiment, one or more data packages may be managed by a data service, to which the client device connects. The data service can match the client device to the appropriate data package intended for use by the connecting client device, and the NSP data package can be provided to the client device for download to provide a customized user experience, for example.

FIG. 1 is a flow diagram illustrating an exemplary method 100 for matching a client device with an appropriate network service provider data package. The exemplary method 100 begins at 102 and involves receiving a device identification (ID) for the client device. At 104, a package decomposition set for the network service provider data package is received, where the package decomposition set comprises one or more ranges of client IDs that are associated with the network service provider data package. At 108, the network service provider data package is provided to the client device if at least a portion of the device ID is comprised in the package decomposition set. Having provided the data package to the client, the exemplary method ends at 110.

As an example, a manufacturer or distributor (e.g., network service provider) of a piece of hardware or a device may provide a device data package (e.g., comprising customized metadata and applications) for the device, such as to enable a customized user experience to an end user. Further, in order to match a data package to an appropriate device the data package provider (e.g., manufacturer or distributor) can assign a list of devices (e.g., or pieces of hardware) to the data package using device (e.g., or hardware) IDs. As an illustrative example, the data package provider may include one or more ranges of device identifiers (e.g., client device IDs or client hardware IDs) with the data package, where the data package is intended to be applied to the devices identified by the one or more ranges.

In one embodiment, the device ID for the client device (e.g., and/or hardware in the client device) can be compared against the one or more ranges of client IDs in the package decomposition set for the network service provider data package. In this embodiment, if the device ID is a member of the package decomposition set, for example, then the network service provider data package may be intended to be used by the client device (e.g., downloaded and installed on the client device). In one embodiment, a decomposition set (e.g., such as the package decomposition set) can comprise a first range of strings that is decomposed into a plurality of second ranges of strings comprised in the first range of strings. It may be appreciated that, as discussed below, at least some of the device ID (e.g., last few digits) may be obscured (e.g., replaced with non-functional alphanumeric characters) to, among other things, facilitate user anonymity.

As an illustrative example, a first range of one hundred to two hundred and fifteen (100-215) comprises second ranges: one hundred to one hundred and ninety nine (100-199), two hundred to two hundred and nine (200-209), and two hundred and ten to two hundred and fifteen (210-215). In this example, the first range (100-215) is decomposed into three second ranges (100-199, 200-209, and 210-215). In one embodiment, the ranges may be expressed as strings, for example, instead of dash-separated numbers. As an illustrative example, the second ranges (100-199, 200-209, and 210-215) may be expressed as: 1XX, 20X, 21X and 215, where the "Xs" can indicate a placeholder for a range of integers (e.g., from 00 to 99, 0 to 9, and 0 to 4, respectively).

In one embodiment, a decomposition set (e.g., such as the package decomposition set) can comprise elements comprising strings that represent the second ranges (e.g., 1XX, 20X, 21X and 215). For example, the range of client IDs assigned to the network service provider data package can be decomposed into a plurality of second ranges, which are represented as strings in the package decomposition set for the network service provider data package. In this way, for example, the device ID can also comprise a string (e.g., series of numbers), and it can be compared against the elements of the package decomposition set to determine if the device ID is a member of the package decomposition set. Further, if the device ID is a member the associated network service provider, the data package can be provided to the device associated with the device ID (e.g., to download and provide a customized user experience on the device).

Figure 2:
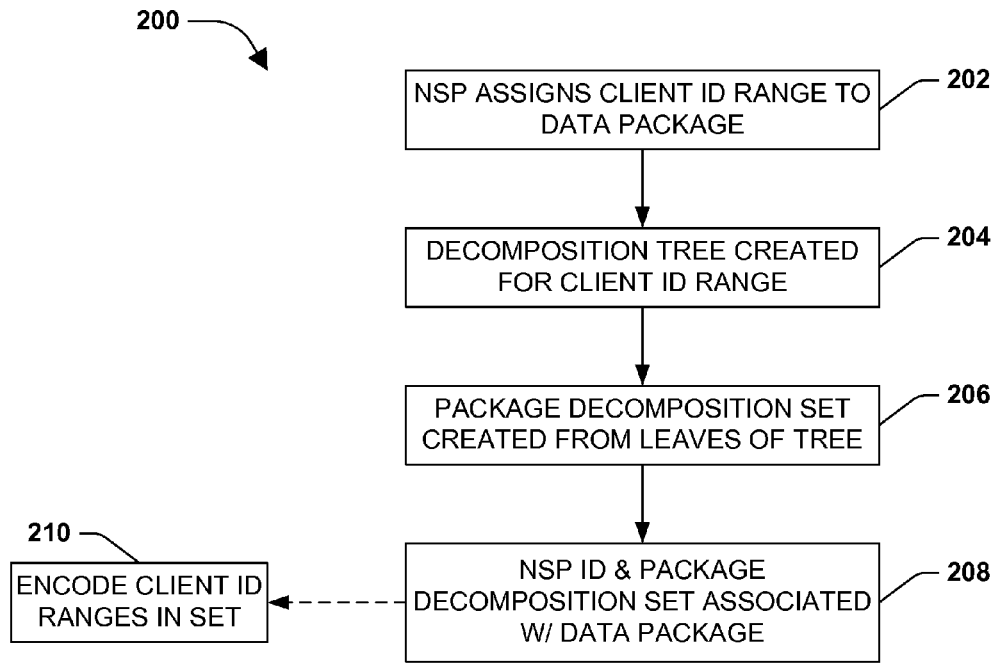
FIG. 2 is flow diagram illustrating an example embodiment of one or more portions of one or more techniques described herein.

FIG. 2 is flow diagram illustrating an example embodiment 200 of one or more portions of one or more techniques described herein. At 202, a network service provider, which may comprise a device or hardware manufacturer, distributor, and/or a provider of data/voice to the device, for example, can assign one or more ranges of client device IDs (client IDs) to a data package intended for use by the client devices identified by the range of client IDs.

For example, a network service provider, such as a mobile network operator (MNO) or mobile virtual network operator (MVNO), may wish to provide a custom, branded user experience to users of their network (e.g., customers). In this example, the network service provider may have a database of client identifiers, such as a service-subscriber key (e.g., International Mobile Subscriber Identity (IMSI)), that are respectively associated with an end user or device. Further, as an example, one or more desired ranges of the client identifiers (e.g., comprising the set, or subset, of the MNO's client identifiers) can be assigned to a data package that provides the custom, branded user experience.

As an illustrative example, a client identifier may comprise a string 100 222 123456789 (e.g., an IMSI), where the first three digits (100) are a Mobile Country Code (MCC), the second three digits (222) are a Mobile Network Code (MNC), and the last nine digits (123456789) are a Mobile Subscriber Identification Number (MSIN). In this example, the MSIN, when combined with the MCC and MNC, may identify the user and/or the device that is comprised in the MNO's (e.g., or MVNO's) customer database. Further, in this example, a set (e.g., or subset) of client identifiers comprised in the customer database may comprise a range of 100 222 123400000 to 100 222 123499999, which includes one hundred thousand clients. The range (e.g., or one or more subsets of the range), for example, can be assigned to the desired network service provider data package (e.g., so that devices having device IDs within this range are provided the network service provider data package, which, in turn, may provide a customized user experience on the devices, for example).

It will be appreciated that the one or more ranges of client IDs associated with the network service provider data package is not limited to the embodiments described herein. Any type of identifier that identifies a user or device (e.g., or hardware) associated with the network service provider may be assigned to the network service provider data package. For example, for a code division multiple access (CDMA) based network service provider, a Provider ID (e.g., System Identification Number (SID)) and/or a Provider Name may be used as a client ID. As another example, for a WiMax based network service provider, a Provider ID, such as a Network Service Provider ID (NSP ID), may be used as a client ID.

In one embodiment, a package decomposition set can be determined using the one or more ranges of client IDs assigned to the network service provider data package. Determining the package decomposition set can comprise decomposing the one or more ranges of client IDs into a set of one or more sub-ranges of data strings or package decomposition ranges comprised in the one or more ranges of client IDs. For example, as described above, the range of one hundred to two hundred and fifteen (100-215) can be decomposed into the sub-ranges one hundred to one hundred and ninety nine (100-199), two hundred to two hundred and nine (200-209), and two hundred and ten to two hundred and fifteen (210-215).

Figure 5:
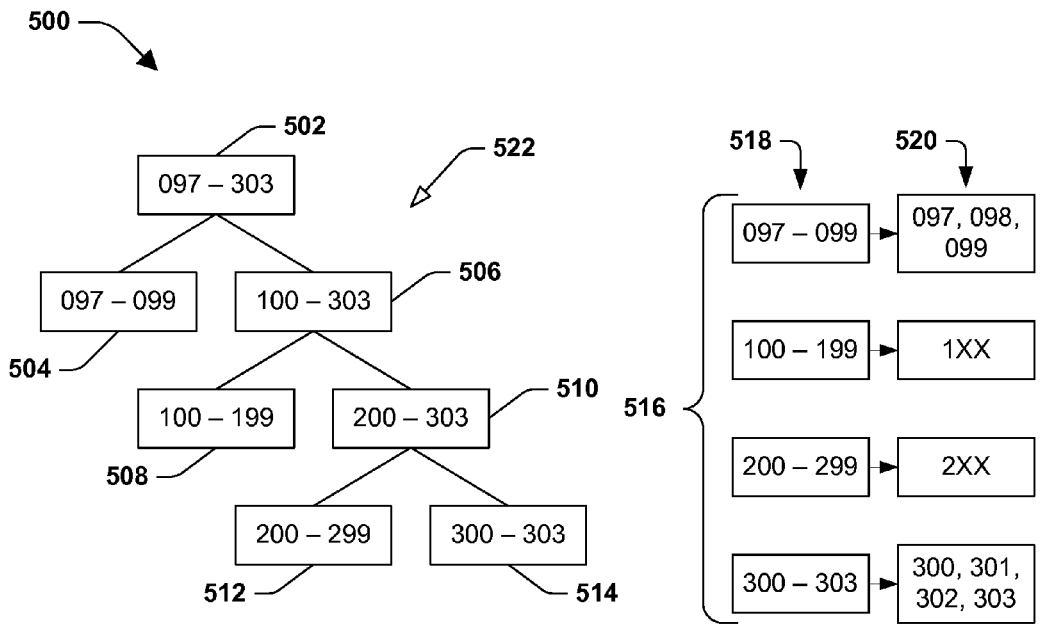
FIG. 5 is a diagram illustrating an example embodiment where a range may be decomposed into one or more sub-ranges.

At 204 in the example embodiment 200, of FIG. 2, one or more decomposition trees may be created for the one or more ranges of client IDs, and used to decompose the one or more ranges into one or more sub-ranges. As an illustrative example, FIG. 5 is a diagram illustrating an example embodiment 500 where a range may be decomposed into one or more sub-ranges. In this example 500, a decomposition tree 522 can be created for a range comprising ninety-seven to three hundred and three.

In one embodiment, the decomposition tree can comprise a root node 502, which can comprise a range of client IDs (e.g., 97 to 303). Further, in this embodiment, for a node of the decomposition tree that comprises a range of min to max (inclusive), let a variable value "x" comprise a smallest integer such that: min≤x<max; and x comprises a maximum potential number of trailing nines (9s). If both arguments are true, in this embodiment, the node can comprise two children nodes. As an example, in FIG. 5, the range 97-303 of the root node 502 comprises an integer ninety-nine (99), which is a smallest integer such that 97≤99<303, and 99 has a maximum potential number of trailing nines (two). Therefore, the root node 502 can comprise two children nodes 504 and 506.

Further, in this embodiment, if the node does comprise two children nodes, a first child node can comprise a range of min to the variable value "x", and a second child node can comprise a range of x plus one (x+1) to max. As an illustrative example, in FIG. 5, the root node 502, comprising the range 97-303, comprises two children nodes 504, 506. The first child node 504 comprises the sub-range ninety-seven (min) to ninety-nine (x); and the second child node 506 comprises the sub-range one-hundred (x+1) to three-hundred and three (max).

Additionally, in this embodiment, if a node does not comprise two child nodes (e.g., min≤x<max and/or x does not have a maximum potential number of trailing 9s), then the node comprises no children nodes. As an illustrative example, in FIG. 5, for node 504 (e.g., the first child node of the root node 503) the range ninety-seven to ninety-nine (97-99) does not comprise an x such that 97≤x<99, where x comprises a maximum potential number of trailing 9s (e.g., would need two nines, but x must be either 97 or 98, therefore cannot comprise trailing 9s). Therefore, in this example, the node 504 cannot comprise two children nodes, and therefore cannot comprise any children nodes (e.g., and therefore comprises a leaf of the decomposition tree).

In the example embodiment 500, the node 506 (e.g., the second child node of the root node 502) meets the criteria to comprise two children nodes 508, 510 (e.g., x=one ninety-nine (199), where 199 is a smallest integer such that 97≤199<303, and 199 has a maximum potential number of trailing nines (two)). Node 508 does not meet the criteria, whereas node 510 does comprise the criteria to have two children nodes, namely 512, 514. However, in this example, both the nodes 512 and 514 do not meet the above described criteria for having children nodes, thereby ending the creation of the decomposition tree (e.g., and the decomposing of the root range 97-303). It will be appreciated that while the maximum potential number of trailing 9s is illustrated as two, a different maximum potential number of trailing 9s is possible. For example, for four digit numbers the maximum potential number of trailing 9s may be three, for five digit numbers the maximum potential number of trailing 9s may be four, etc. Accordingly, any suitable number of trailing 9s is contemplated as falling within the scope of this application, including the appended claims. That is, limitation to merely the examples provided herein is not intended.

Returning to FIG. 2, at 206, the package decomposition set can be derived from one or more sub-ranges from leaves of the decomposition tree of a range of client IDs. As an illustrative example, in FIG. 5, the leaves of the decomposition tree comprise the nodes 504, 508, 512, and 514. In this embodiment, the package decomposition set 516 can comprise the sub-ranges 518: ninety-seven to ninety-nine (97-99), one-hundred to one hundred and ninety-nine (100-199), two hundred to two hundred and ninety-nine (200-299), and three hundred to three hundred and three (330-303).

Further, the sub-ranges 518 of the package decomposition set 516 may be represented as data strings which are representative of package decomposition ranges 520 that comprise the sub-ranges 518. For example, one-hundred to one-hundred and ninety-nine (100-199) may be represented as 1XX, where an "X" can comprise a placeholder indicator of a number from zero to nine (0-9) (e.g., as a range). In this example, the package decomposition 516 set can comprise the representative ranges: 097, 098, 099 (e.g., or 09X with X possibly being indicative of merely 7, 8 or 9), 1XX, 2XX, 300, 301, 302, and 303 (e.g., or 30X with X possibly being indicative of merely 0, 1, 2 or 3).

Returning to FIG. 2, at 208, an ID for the network service provider (NSP ID), and the package decomposition set can be associated with (e.g., assigned to) the network service provider data package. For example, the NSP ID and package decomposition set can be linked to the data package using a database, or some other data storage container. In this example, the decomposition set may be looked up, such as to compare against a device ID (e.g., to determine if the device ID falls within the package decomposition set such that the data package can be provided to the device (if the device ID falls within the package decomposition set)).

In one embodiment, at 210, the package decomposition set (e.g., one or more package decomposition ranges thereof) may be encoded, such as to provide security when sending/receiving the set. A network service provider may wish to protect a list or range of subscriber IDs, for example, to keep competitors from estimating a number of subscribers. In this example, given a decade decomposition set, it may be trivial to estimate the corresponding range of subscriber IDs.

In one embodiment, encoding can comprise hashing at least a portion of the package decomposition set to yield a package hash value. For example, a cryptographically safe hash function may be used to generate package hash values for the package decomposition set. As an illustrative example, the hash function SHA256 may be implemented, where this algorithm can reliably generate encoded strings (e.g., same output every time given same input), can generate different encoded strings for different inputs, and the input cannot be derived from the output encoded string.

In this example, the output of the SHA256 function is an array of 32 bytes. In one embodiment, the output package hash value can be converted to a text string. For example, the array of 32 bytes may be converted to a text string using a standard hexadecimal encoding. Further, in this example, the hexadecimal text string may be used to match against a device ID (e.g., that has also been converted to a hexadecimal text string).

In one embodiment, security of the device ID and/or privacy concerns about sharing the device ID may be promoted by obscuring at least a portion of the device ID, for example, which may be sent to match against a package decomposition set. For example, one or more of the last Z numbers of the "device ID" sent to a server for matching can be obscured, such as by replacing them with a non-functional alphanumeric character. In this embodiment, obscuring can be done to promote user privacy and/or for added security. As another example, the specific device ID for the client device is not sent, instead, the device ID minus the last two (or other number of) digits (e.g., or with the last two (or other number of) digits obscured) can be sent for matching. Obscuring or removing one or more digits can thus help maintain some level of user anonymity while still allowing a Network Service Provider to provide a customized experience for a set of devices. For example, obscuring or removing the last k digits may help with privacy because if an eavesdropper were to be able to "crack" hashed IDs that a device sends to a server, all that the eavesdropper would get is the pool of $10^k$ ID numbers to which the device belongs. Anonymity is thus preserved essentially by hiding the device in a crowd.

Figure 3:
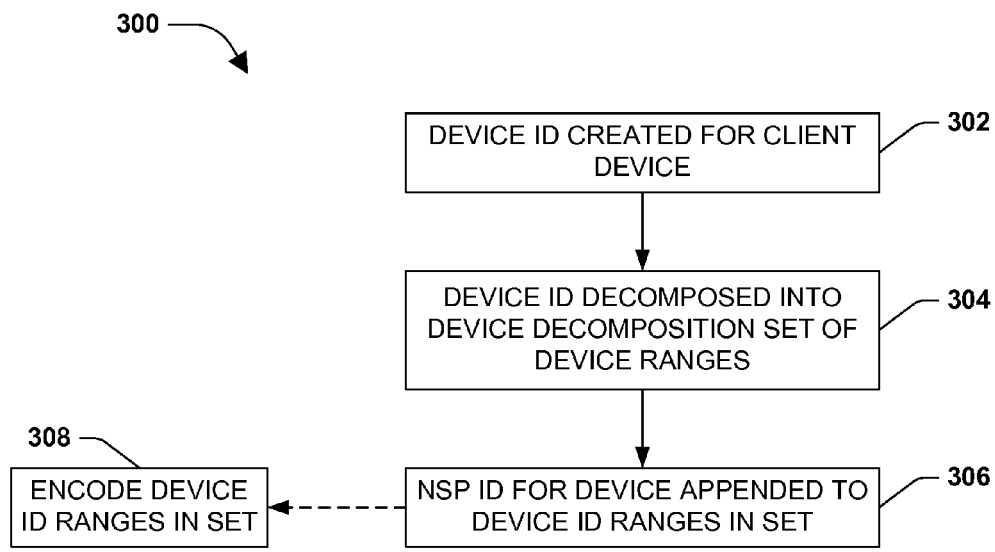
FIG. 3 is a flow diagram illustrating an example embodiment of one or more portions of one or more techniques described herein.

FIG. 3 is a flow diagram illustrating an example embodiment 300 of one or more portions of one or more techniques described herein. At 302, a device ID is created for a client device. For example, a client device may comprise a computing device that connects to a network service provider, such as a mobile device (e.g., smart-phone, handheld computer, gaming device, laptop, camera, etc.), or networked hardware (e.g., pc, console device, gaming console, television, etc.). In this example, the device ID may be generated using an identification from one or more pieces of hardware, software, and/or subscriber information associated with the client device. As an illustrative example, as described above, the device ID may be generated from the IMSI for the device, comprising the MCC, MNC, and the MSIN, when utilizing a Global Systems for Mobile communications (GSM) based network.

Figure 6:
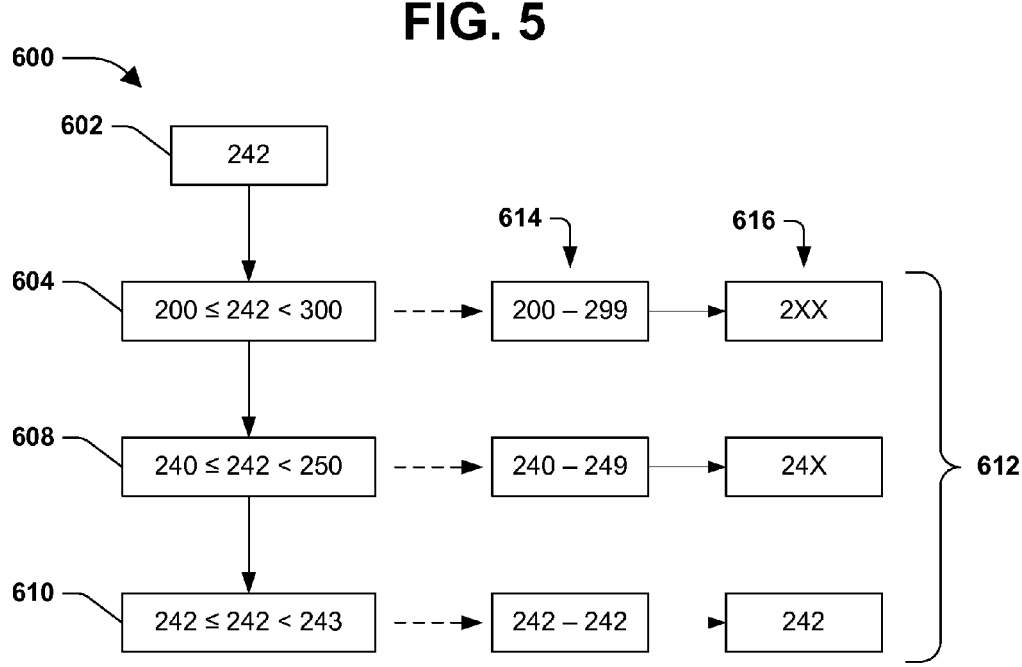
FIG. 6 is a diagram illustrating an example embodiment where an ID may be decomposed into one or more ID ranges.

At 304, the device ID can be decomposed into a device decomposition set, comprising one or more device ID ranges. As an illustrative example, FIG. 6 is a diagram illustrating an example embodiment 600 where a device ID may be decomposed into one or more ID ranges. In the example embodiment 600, an example ID number two-hundred and forty-two 602 can be decomposed to create the device decomposition set 612.

In one embodiment, the device decomposition set may be determined by decomposing the device ID into multiples of base powers (e.g., powers of ten). For example, as illustrated in FIG. 6, a highest multiple of a base power of ten for the device ID 602 is ten squared ($10^2$). In this embodiment, for example, a first ID decomposition 604 can comprise $2 \times 10^2 \leq 242 < 3 \times 10^2$, which comprises an ID range 614 of two hundred to two hundred and ninety-nine (200-299).

Further, in this embodiment, a second ID decomposition 608 can comprise a range for the device ID at a base power below that of the first range, for example, $(2 \times 10^2 + 4 \times 10^1) \leq 242 < (3 \times 10^2 + 5 \times 10^1)$. In this example, the second ID decomposition 608 can comprise an ID range 614 of two-hundred and forty to two-hundred and forty-nine (240-249). Additionally, a third ID decomposition 610 can comprise a range for the device ID at a base power below that of the second range (e.g., and so-on). For example, a third ID decomposition 610 can comprise $(2 \times 10^2 + 4 \times 10^1 + 2 \times 10^0) \leq 242 < (3 \times 10^2 + 5 \times 10^1 + 3 \times 10^0)$, which can be comprise an ID range 614 of two-hundred and forty-two to two-hundred and forty-two (242-242) (e.g., comprising merely the device ID 602).

As described above, the respective ID ranges 614 can be expressed as device ID ranges 616 using "X" as a placeholder indicator. For example, the ID range 614 of two hundred to two-hundred and nine-nine can be expressed as a device ID range of 2XX, where the "X"s respectively indicate a range of zero to nine (0-9). Further, in this example, the ID range 614 of two-hundred and forty to two-hundred and forty-nine can be expressed as a device ID range 616 of 24X. Additionally, in this example, the ID range 614 of two-hundred and forty-two to two-hundred and forty-two merely comprises the device ID range 616 of 242.

Returning to FIG. 3, at 306, a network operator ID can be appended to respective device ID ranges in the device decomposition set. For example, in a GSM-based network, the network operator ID may comprise the MCC and MNC; in a CDMA, Wifi, and/or WiMax based networks, a Provider ID may be used for the network operator ID. In one embodiment, the device decomposition set can comprise one or more device ID ranges that respectively comprise a network operator ID for a network service provider associated with the client device, one or more portions of a subscriber ID associated with the client device, and/or one or more placeholder indicators that represent a device ID range for the client device. In this embodiment, appending the network operator ID to the respective device ID ranges, for example, may facilitate in identifying the appropriate NSP for the client device.

In one embodiment, at 308, the device decomposition set (e.g., one or more device ID ranges thereof) may be encoded, such as to provide security when sending/receiving the set. A user of the client device, for example, represented by the device decomposition set may wish to protect their subscriber, for example, to keep malicious users from intercepting sensitive information. In this example, given a device decomposition set, the subscriber ID for the client device may be derived, and potentially misused. Further, in this embodiment, encoding can comprise hashing at least a portion of the device decomposition set to yield a device hash value. For example, a same cryptographically safe hash function may be used to generate the device hash value as was used for encoding the package decomposition set. As an illustrative example, the hash function SHA256 may be implemented for both the device decomposition set and the package decomposition set, such that the resulting hash values can be compared to each other. It will be appreciated, however, that other hash functions can be used for the device decomposition set and/or the package decomposition set.

Figure 4:
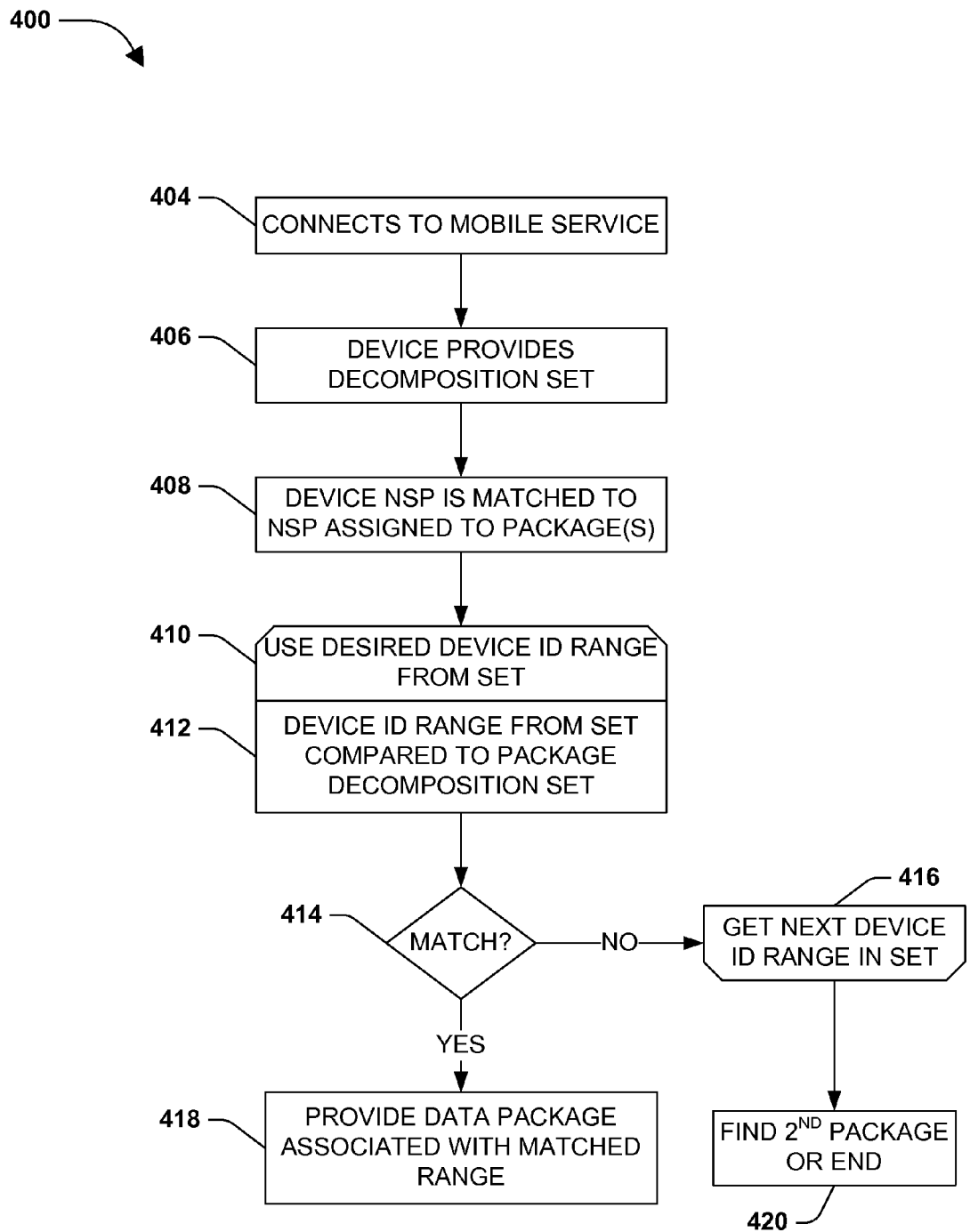
FIG. 4 is a flow diagram illustrating an example embodiment of one or more portions of one or more techniques described herein.

FIG. 4 is a flow diagram illustrating an example embodiment 400 of one or more portions of one or more techniques described herein. At 404 in the example embodiment 400, a client device connects to a mobile service. At 406, the client device can provide a device decomposition set (for the device), for example, to a service providing a connection, and/or to a data management service that provides appropriate network service provider data packages to client devices.

At 408, the NSP provider for the client device is matched to one or more NSP data packages. For example, a NSP may provide one or more data packages to the data management service to provide to appropriate client devices. In this example, the respective NSP data packages may comprise network operator IDs for the providing NSP (e.g., to identify which NSPs provided which data packages). Further, in this example, the network operator ID for the data package(s) can be matched with the network operator ID associated with the device decomposition set to find one or more appropriate NSP data packages for the client device (e.g., to be examined further to see if the device ID falls within a package decomposition set).

At 410, a first device ID range from the device decomposition set is used to compare with a package decomposition set, at 412. As an illustrative example, as illustrated in FIGS. 5 and 6, the package decomposition set 516 comprises package decomposition ranges 520, and the device decomposition set 612 comprises device ID ranges. In one embodiment, the respective device ID ranges 616 can be compared to the package decomposition ranges 520 (e.g., one at a time) to determine if the two sets 516, 612 intersect.

In one embodiment, the first device ID range 616 compared to the package decomposition set 516 can comprise the device ID range 616 having a smallest number of placeholder indicators (e.g., 242). In this embodiment, for example, by starting the comparison from a more specific device ID range and proceeding up to a device ID range having the most placeholder indicators, a more specific match may be identified first. For example, the device ID range of 242 can be compared to the package decomposition set 516 and determined not to be a member (e.g., no intersection).

Returning to FIG. 4, if no match is found at 414, the next device ID range is used to compare with the package decomposition set. For example, as illustrated in FIGS. 5 and 6, the next device ID range 24X can be compared to the package decomposition set 516 and found not to be a member. This can be repeated up to and through the last device ID range. For example, last device ID range 2XX does match a package decomposition range 2XX in the package decomposition set 516. If no more device ID ranges are available from the device decomposition set 612, the example embodiment ends at 420, for example, and the device decomposition set 612 may be compared against a second package decomposition set (e.g., or found to have no matching data package, such that no customized user experience would be provided to a user via the mobile device). However, if a device ID range matches a package decomposition range (e.g., 2XX), the device decomposition set and the package decomposition set intersect. At 418, if an intersection is identified, the data package associated with the matched package decomposition range 520 from the package decomposition set 516 is provided to the client device.

A system may be devised for matching a client device to an appropriate data package from a network service provider. For example, a network service provider (NSP) can assign a range of client identifications (IDs) to a custom data package intended for downloading and use by one or more client devices comprised in the client ID range. In one embodiment, when the device ID for a client device matches or falls within a client ID range assigned to a data package, the NSP data package can be provided to the client device for download, and customization, for example.

Figure 7:
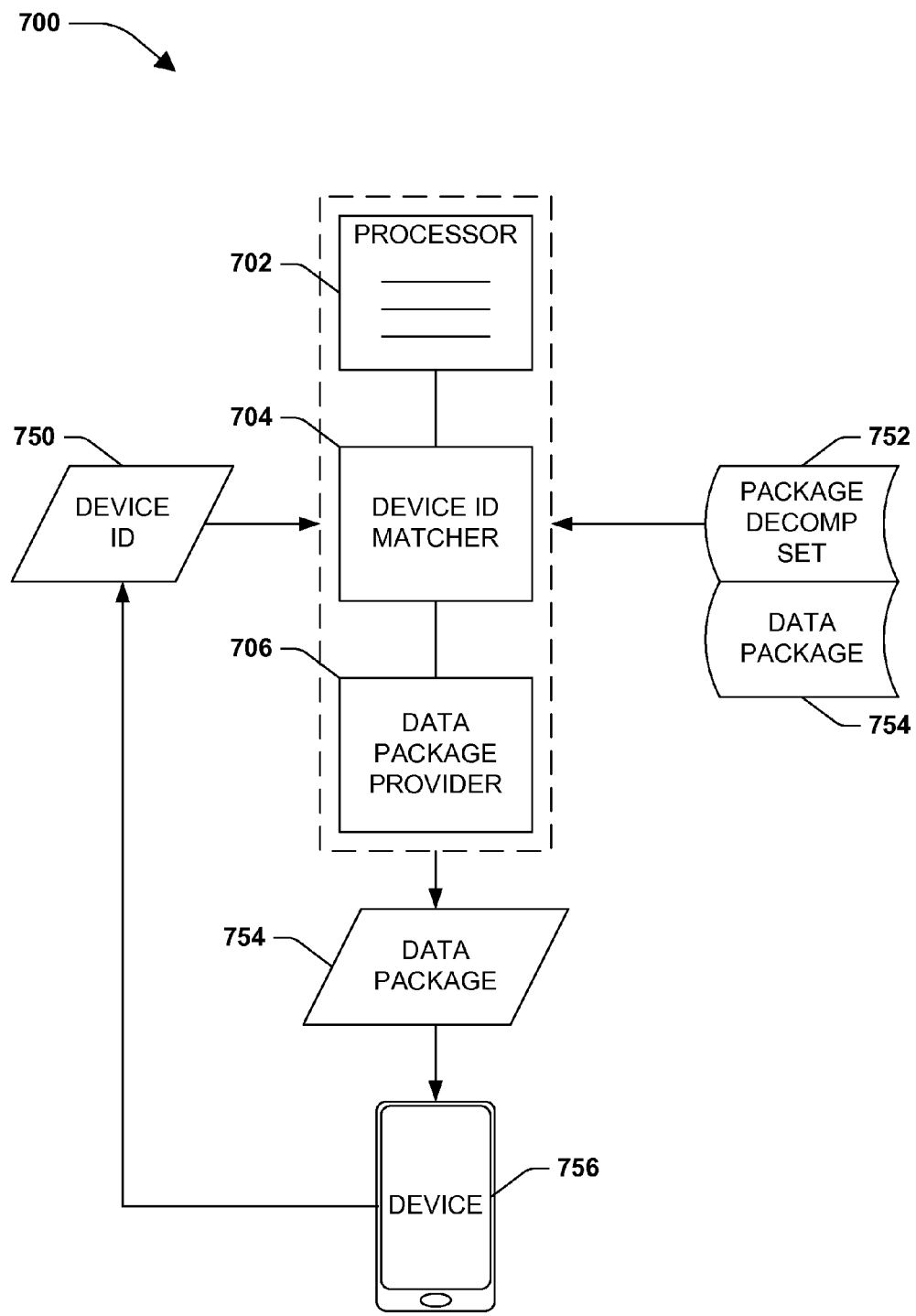
FIG. 7 is a component diagram illustrating an exemplary system for matching a client device with an appropriate network service provider data package.

FIG. 7 is a component diagram illustrating an exemplary system 700 for matching a client device 756 with an appropriate network service provider data package. A computer-based processor 702 is configured to process data for the system, and is operably coupled with a device ID matching component 704. The device ID matching component 704 is configured to determine whether at least a portion of a device identification (ID) 750 for the client device 756 is comprised in a package decomposition set 752 (e.g., comprising one or more package decomposition ranges) for the network service provider data package 754. Further, the package decomposition set 752 comprises one or more ranges of client IDs assigned to the network service provider data package 754.

A data package providing component 706 is operably coupled with the device ID matching component 704, and configured to provide the network service provider data package 754 to the client device 756 if at least a portion of the device ID 750 is comprised in the package decomposition set 752. For example, the exemplary system 700 may receive the device ID 750, and the device ID matching component 704 can compare it to the package decomposition set 752 associated with the data package 754. In this example, if the device ID 750 is found to be a member of the package decomposition set 752, the data package providing component 706 can provide the data package 754 to the client device 756, such as for downloading and applying to customization of the device 756.

Figure 8:
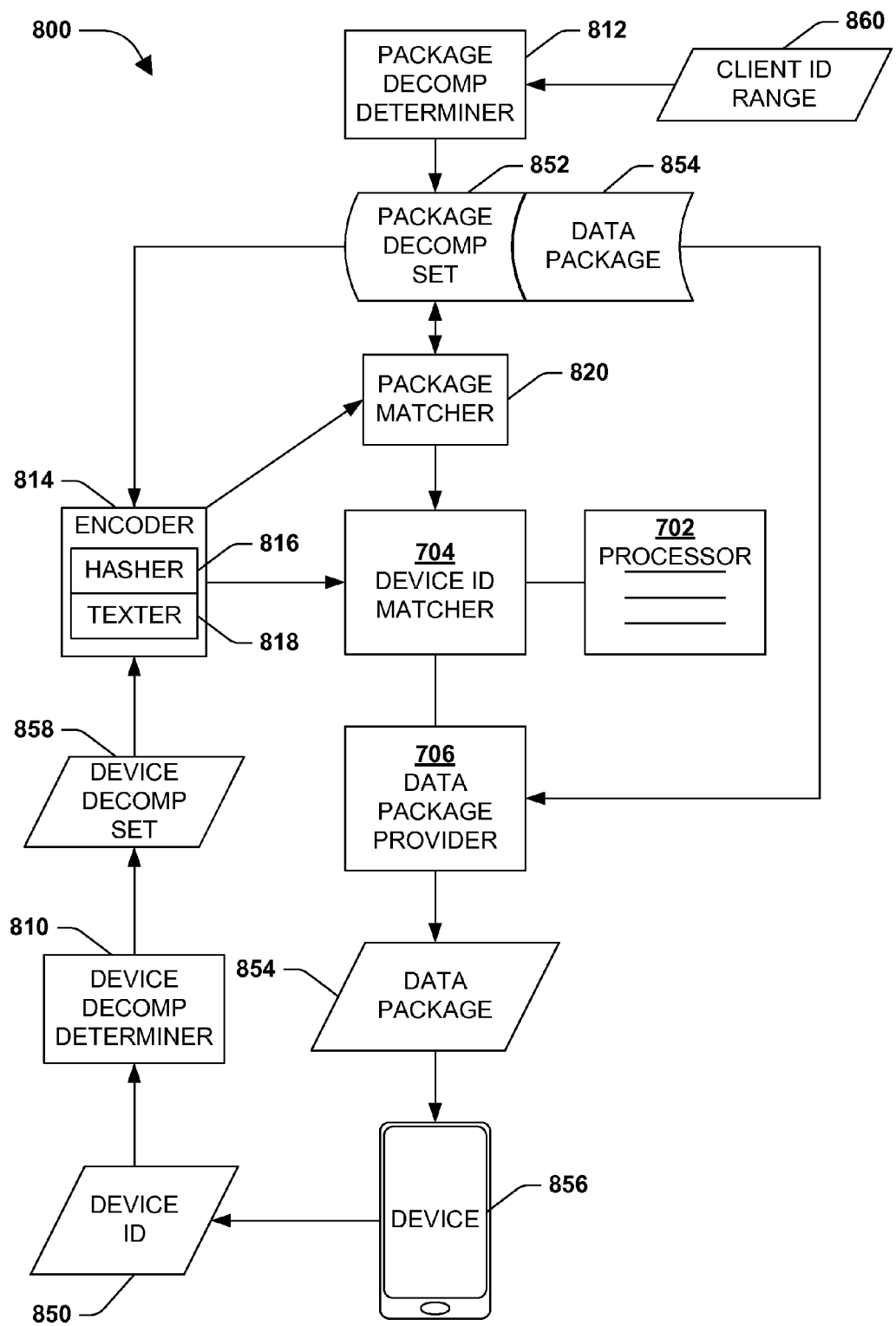
FIG. 8 is a component diagram illustrating an example embodiment where one or more systems described herein may be implemented.

FIG. 8 is a component diagram illustrating an example embodiment 800 where one or more systems described herein may be implemented. In this example 800, an extension of FIG. 7 is provided and thus description of elements, components, etc. described with respect to FIG. 7 may not be repeated for simplicity. A device decomposition set determination component 810 is configured to determine a device decomposition set 858 for a device ID 850. The device decomposition set 858 can comprise one or more device ID ranges (e.g., represented as ranges of device ID data strings), where the one or more ranges of device ID data strings respectively comprise the device ID 850. For example, the respective ranges in the device decomposition set comprise the device ID, such as a device ID of 242 comprised in the range 200-299.

A package decomposition set determination component 812 is configured to determine a package decomposition set 852 (e.g., comprising one or more package decomposition ranges) that is associated with (e.g., assigned to) the network service provider data package 854. In one embodiment, the package decomposition set determination component 812 uses one or more ranges of client IDs 860 provided by the network service provider to determine the package decomposition set 852 (e.g., via a decomposition tree, such as illustrated in FIG. 5 and/or per 204/206 of FIG. 2).

An encoding component 814 can be configured to encode the device ID 850, for example, as the one or more device ID ranges in the device decomposition set 858. Further, the encoding component 814 can be configured to encode the package decomposition set 852, for example, as the one or more package decomposition ranges in the package decomposition set 852. The encoding component 814 can comprise a hashing component 816 configured to determine a hash value for the device ID 850 and/or the package decomposition set 852. Additionally, the encoding component 814 can comprise a text string component 818 configured to covert the hash value to a text string (e.g., a hexadecimal string) for the device ID 850 (e.g., the device ID ranges in the device decomposition set 858) and/or the package decomposition set 852.

A package matching component 820 can be configured to match the client device 856 with one or more network service provider data packages 854 based at least upon a mobile network operator identification for the client device 856. For example, the device ID 850 for the client device 856 can comprise a network operator ID for the network service provider (NSP) of the client device. In this example, the network operator ID can be appended to one or more of the device ID ranges in the device decomposition set (e.g., or the entire set). Further, the package matching component 820 can use the network operator ID associated with the device ID 850 to identify a data package from a same NSP.

In the example embodiment 800, the data package providing component 706 can be configured to provide an appropriate data package 854, from the one or more network service provider data packages, based at least upon a portion of the device ID 850 that is matched with an element in the package decomposition set 852. For example, the package matching component 820 can identify an appropriate data package for the client device based on a network operator ID for the device (e.g., appended to one or more device ID ranges in the device decomposition set for the device). In this manner, merely a data package from the network upon which the device is operating may be identified (e.g., as opposed to a (potentially incompatible) data package from a different network service provider upon which the device is not operating). With the data package identified, the device ID matching component can then attempt to match one or more of the device ID ranges from the device decomposition set with a package decomposition range in the package decomposition set for the identified data package. If a match is found (e.g., the two sets intersect), the data package provider can provide the associated data package 854 to the client device 856, such as to download and customize the client device 856. Similarly, an attempt can be made to match one or more of the device ID ranges from the device decomposition set with a package decomposition range in the package decomposition set for other identified data packages so that other data packages may be provided, downloaded, etc. to the device.

Figure 9:
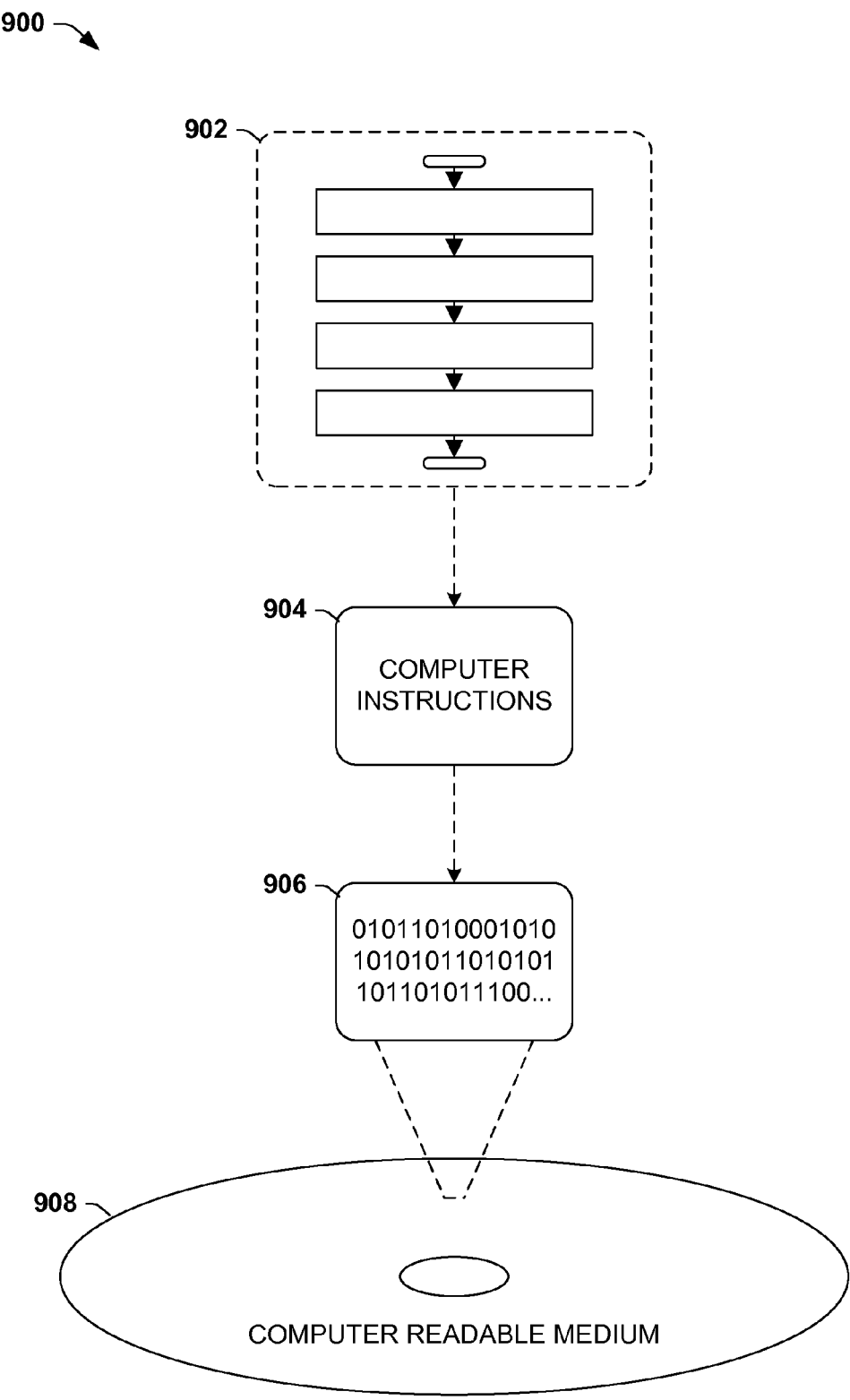
FIG. 9 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 908 (e.g., a CD-R, DVD-R, or a platter of a hard disk drive), on which is encoded computer-readable data 906. This computer-readable data 906 in turn comprises a set of computer instructions 904 configured to operate according to one or more of the principles set forth herein. In one such embodiment 902, the processor-executable instructions 904 may be configured to perform a method, such as at least some of the exemplary method 100 of FIG. 1, for example. In another such embodiment, the processor-executable instructions 904 may be configured to implement a system, such as at least some of the exemplary system 700 of FIG. 7, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
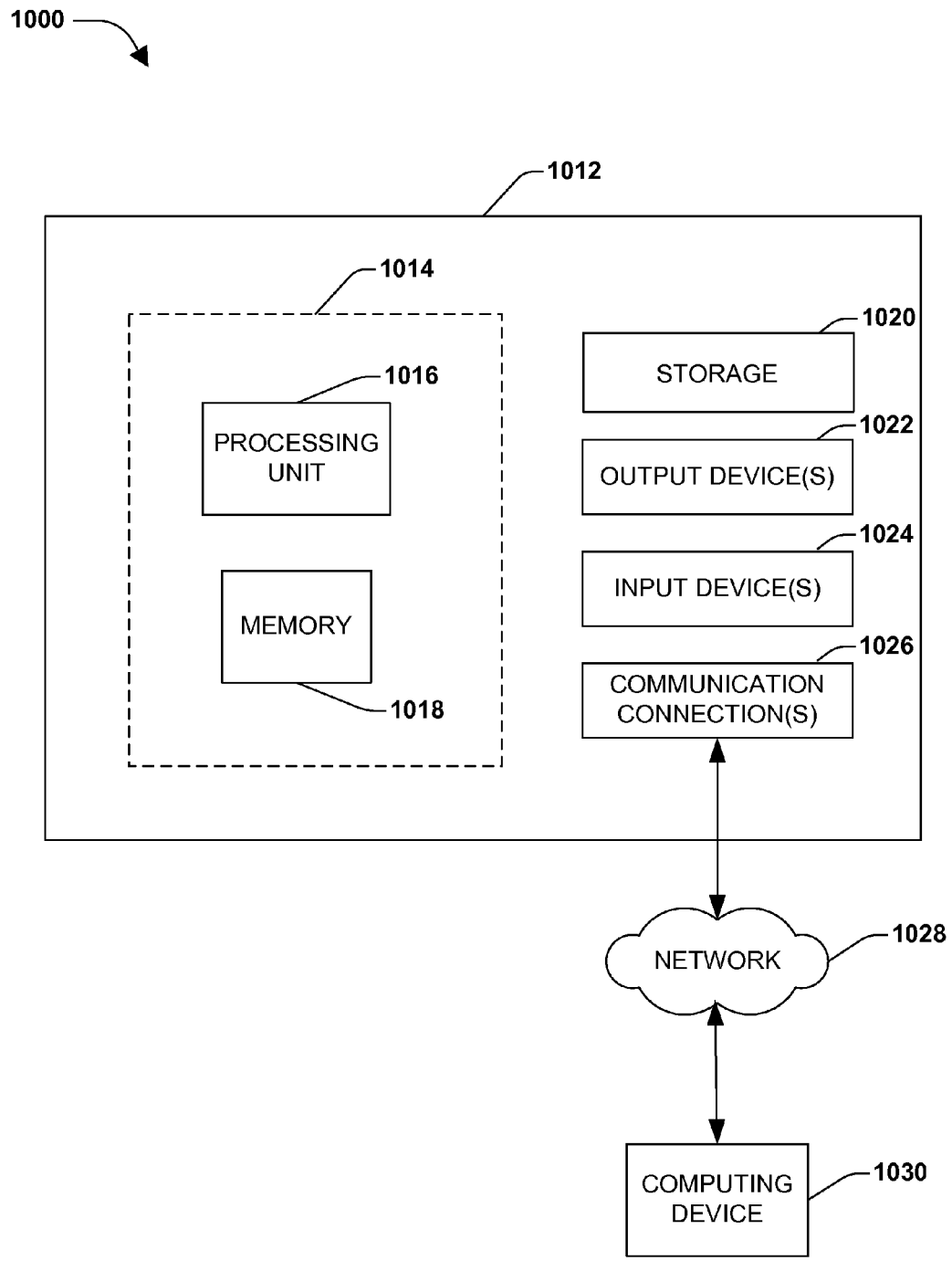
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, implemented at least in part via a processing unit, comprising:
   receiving a device identification (ID) for a client device;
   receiving a package decomposition set for a network service provider data package, the package decomposition set comprising one or more ranges of client IDs associated with the network service provider data package, the network service provider data package corresponding to a first network service provider; and
   providing the network service provider data package to the client device if the client device is determined to be associated with the first network service provider based upon at least a portion of the device ID falling within at least some of the one or more ranges of client IDs associated with the network service provider data package.

2. The method of claim 1, the client device comprising a mobile device.

3. The method of claim 1, comprising determining a device decomposition set associated with the device ID.

4. The method of claim 1, comprising encoding the device ID.

5. The method of claim 4, encoding comprising:
hashing at least a portion of the device ID resulting in a device hash value.

6. The method of claim 1, the first network service provider comprising a mobile network operator.

7. The method of claim 1, the first network service provider comprising a mobile virtual network operator.

8. The method of claim 1, the client device comprising at least one of a mobile phone or a SIM card.

9. The method of claim 1, comprising encoding the package decomposition set.

10. The method of claim 9, encoding comprising:
hashing at least a portion of the package decomposition set resulting in a package hash value.

11. The method of claim 4, encoding comprising:
obscuring at least a portion of the device ID.

12. The method of claim 4, encoding comprising:
removing at least a portion of the device ID.

13. A system comprising:
one or more processors;
at least one computer-readable storage medium coupled to the one or more processors, the at least one computer-readable storage medium having instructions stored thereon which, when executed by the one or more processors cause the system to perform operations comprising:
receiving a device identification (ID) for a client device; and
receiving a package decomposition set for a network service provider data package, the package decomposition set comprising one or more ranges of client IDs associated with the network service provider data package, the network service provider data package corresponding to a first network service provider; and
providing the network service provider data package to the client device if the client device is determined to be associated with the first network service provider based upon at least a portion of the device ID falling within at least some of the one or more ranges of client IDs associated with the network service provider data package.

14. The system of claim 13, wherein the operations further comprise determining a device decomposition set associated with the device ID.

15. The system of claim 13, wherein the operations further comprise determining the package decomposition set.

16. The system of claim 13, wherein the operations further comprise encoding one or more of:
the device ID; or
the package decomposition set.

17. The system of claim 13, wherein the operations further comprise hashing at least a portion of the device ID for encoding the device ID.

18. The system of claim 13, the client device comprising at least one of a mobile phone or a SIM card.

19. The system of claim 13, the first network service provider comprising a mobile network operator.

20. A computer readable device comprising computer executable instructions that when executed via a processing unit perform a method, comprising:
receiving a device identification (ID) for a client device;
receiving a package decomposition set for a network service provider data package, the package decomposition set comprising one or more ranges of client IDs associated with the network service provider data package, the network service provider data package corresponding to a first network service provider; and
providing the network service provider data package to the client device if the client device is determined to be associated with the first network service provider based upon at least a portion of the device ID falling within at least some of the one or more ranges of client IDs associated with the network service provider data package.

* * * * *